US012769970B2

(12) United States Patent
Ramamurthy et al.

(10) Patent No.: US 12,769,970 B2
(45) Date of Patent: Oct. 20, 2026

(54) SECURE CARD

(71) Applicant: Visa International Service Association, San Francisco, CA (US)

(72) Inventors: Rakesh Ramamurthy, Bangalore (IN); Pranavi Sharma, Haryana (IN); Vivekraj Gulshani, Gwalior (IN); Arjun Kumar Gupta, Bengaluru (IN)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/787,852

(22) Filed: Jul. 29, 2024

(65) Prior Publication Data

US 2026/0030471 A1 Jan. 29, 2026

(51) Int. Cl.

| | |
|---|---|
| ***G06K 19/06*** | (2006.01) |
| ***G06F 21/31*** | (2013.01) |
| ***G06Q 20/32*** | (2012.01) |
| ***G06Q 20/34*** | (2012.01) |
| ***G07F 7/08*** | (2006.01) |
| ***G07F 7/12*** | (2006.01) |
| ***H04L 9/08*** | (2006.01) |

(52) U.S. Cl.

CPC ........ *G06K 19/06103* (2013.01); *G06F 21/31* (2013.01); *G06Q 20/347* (2013.01); *H04L 9/0819* (2013.01)

(58) Field of Classification Search

CPC .......... G06F 21/31; G06F 21/77; G06F 21/34; G06F 21/6245; G06F 16/64; G06F 21/6209; G06Q 20/347; G06Q 20/382; G06Q 50/265; G06K 19/06103; G06K 19/06084; G06K 19/06093; G06K 19/06065; G06K 19/0723; G06K 19/07722; H04L 9/0819

See application file for complete search history.

(56) References Cited

U.S. PATENT DOCUMENTS

| | | | | |
|---|---|---|---|---|
| 11,062,098 | B1 | 7/2021 | Bergeron et al. | |
| 11,720,901 | B2 | 8/2023 | Rule | |
| 2014/0093070 | A1* | 4/2014 | Dougharty | G09C 5/00 380/28 |
| 2016/0246970 | A1* | 8/2016 | Otero | G06F 21/6209 |
| 2022/0215216 | A1* | 7/2022 | Wahl | G06K 19/06046 |

FOREIGN PATENT DOCUMENTS

| | | | | |
|---|---|---|---|---|
| AU | 2017257417 | A1 * | 12/2018 | G06F 21/32 |
| CN | 112101962 | A * | 12/2020 | |

OTHER PUBLICATIONS

Stenography using palette images (Year: 2009).*
Steganography in Modern Smartphones and Mitigation Techniques (Year: 2015).*

* cited by examiner

*Primary Examiner* — Thien T Mai
(74) *Attorney, Agent, or Firm* — K&L Gates LLP

(57) ABSTRACT

A secure card associated with an account of a cardholder is disclosed herein. The secure card includes a card face with imperceptible card indicia including at least a portion of at least one of an account number, a name, a card verification value, or an expiration date. The card face includes an image. Imperceptible card indicia are encoded within the image.

17 Claims, 9 Drawing Sheets

SECURE CARD

TECHNICAL FIELD

The present disclosure is directed to a secure card with imperceptible card indicia.

SUMMARY

In one aspect the present disclosure provides a secure card associated with an account of a cardholder. The secure card can include a card face with imperceptible card indicia including at least a portion of at least one of an account number, a name, a card verification value, or an expiration date. The card face can include an image. Imperceptible card indicia are encoded within the image.

In another aspect, the present disclosure provides a computer-implemented method. The method can include authenticating, by a user device, a cardholder to access card information imperceptible in an image on a card associated with a cardholder account of the cardholder; capturing, by an imaging device of the user device, the image based on a successful authentication of the cardholder; processing, by the user device, the image to generate image data from the captured image; decoding, by the user device, the image data to extract the card information from the image data; and presenting, by the user device, the card information to the authenticated cardholder.

In another aspect, the present disclosure provides a computer-implemented method. The method can include generating an image on a card associated with an account of a cardholder. The image is encoded with card information associated with the account. The method can further include authenticating the cardholder based on an authentication request from a user device and transmitting decoding data to the user device based on a successful authentication of the cardholder.

BRIEF DESCRIPTION OF THE DRAWINGS

In the description, for purposes of explanation and not limitation, specific details are set forth, such as particular aspects, procedures, techniques, etc. to provide a thorough understanding of the present technology. However, it will be apparent to one skilled in the art that the present technology may be practiced in other aspects that depart from these specific details.

The accompanying drawings, where like reference numerals refer to identical or functionally similar elements throughout the separate views, together with the detailed description below, are incorporated in and form part of the specification, and serve to further illustrate aspects of concepts that include the claimed disclosure and explain various principles and advantages of those aspects.

Figure 1:
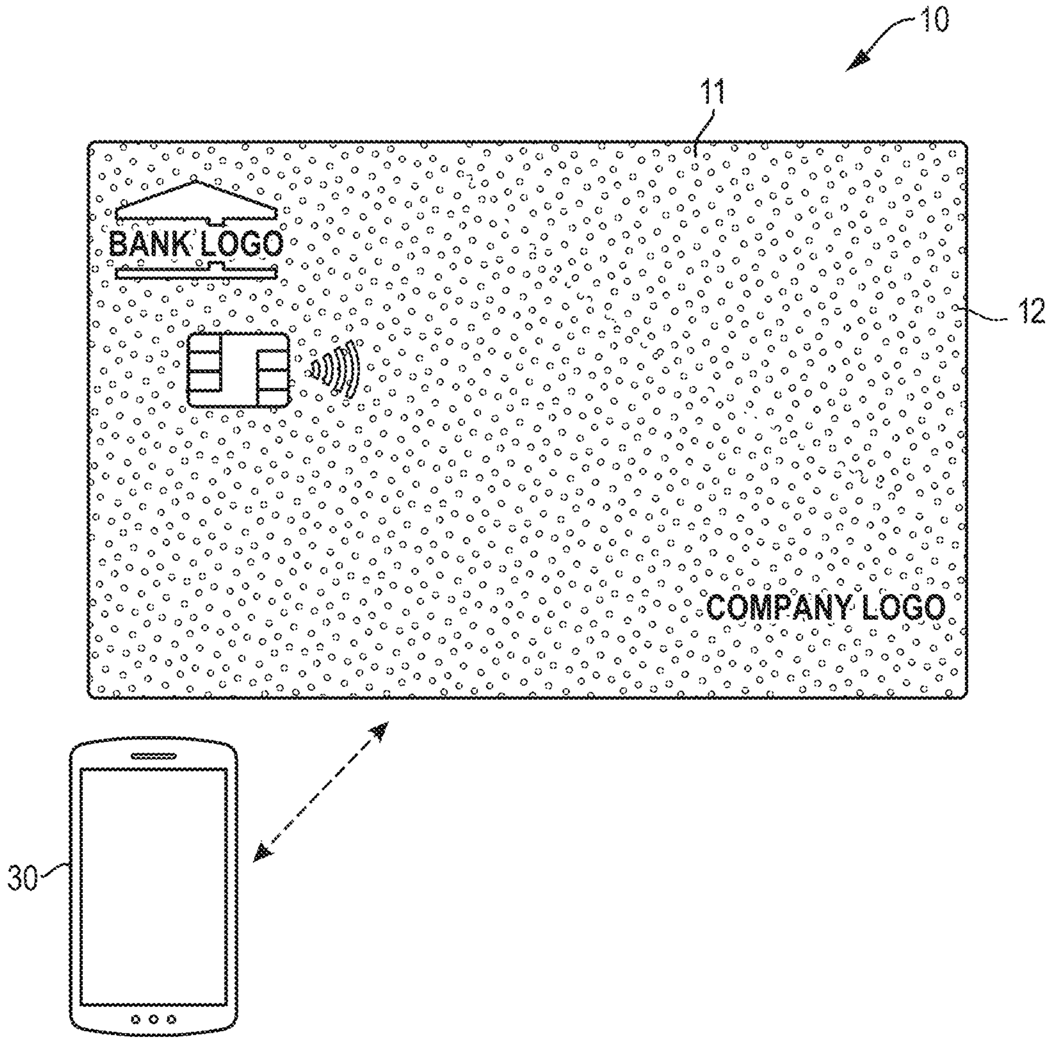

Various details of the present disclosure have been represented where appropriate by conventional symbols in the drawings, showing only those specific details that are pertinent to understanding the various aspects of the present disclosure so as not to obscure the disclosure with details that will be readily apparent to those of ordinary skill in the art having the benefit of the description herein.

FIG. 1 illustrates a card and a user device, according to at least one aspect of the present disclosure.

Figure 2:
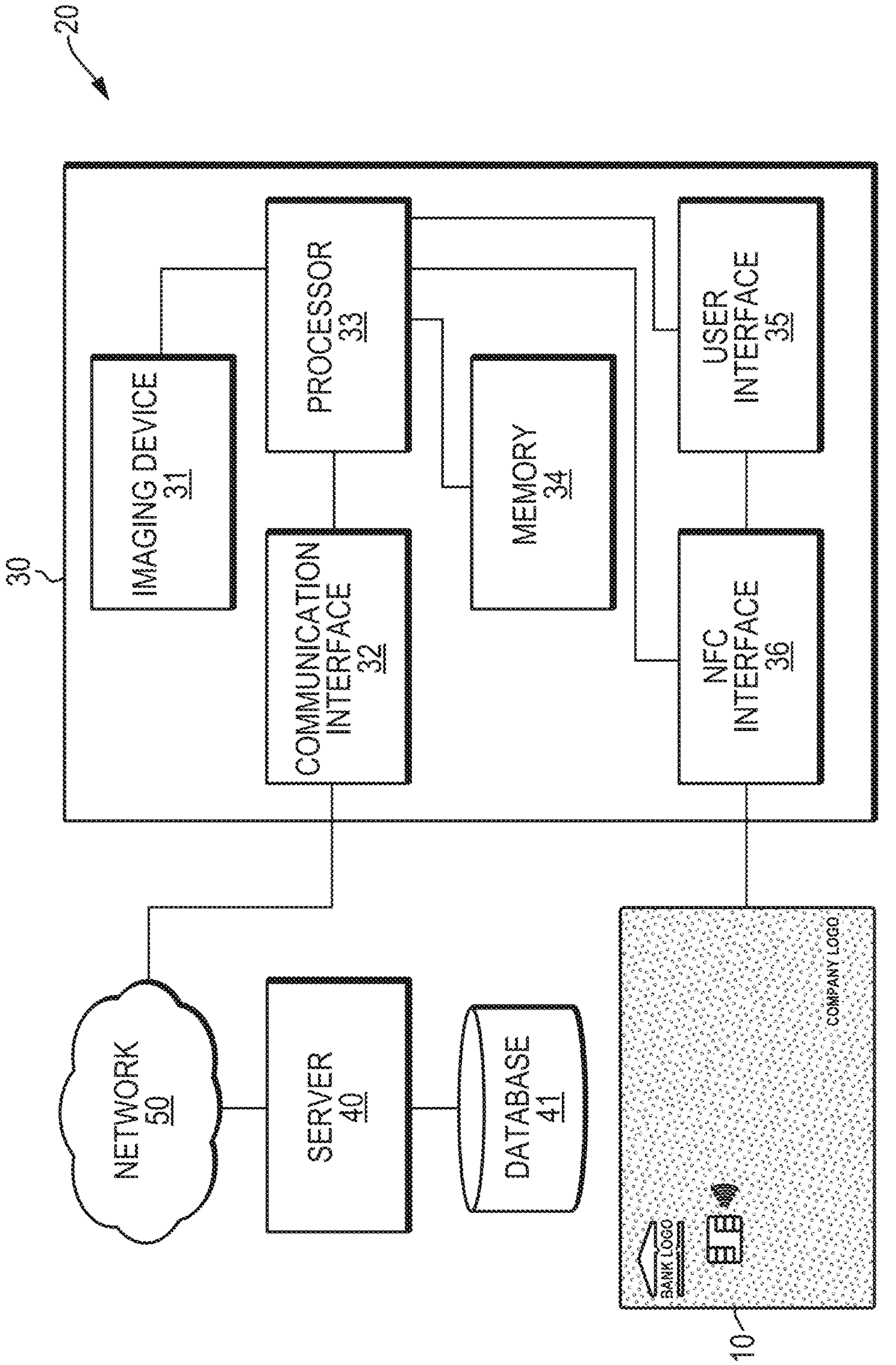

FIG. 2 illustrates components of a system for use with the card of FIG. 1.

Figure 3:
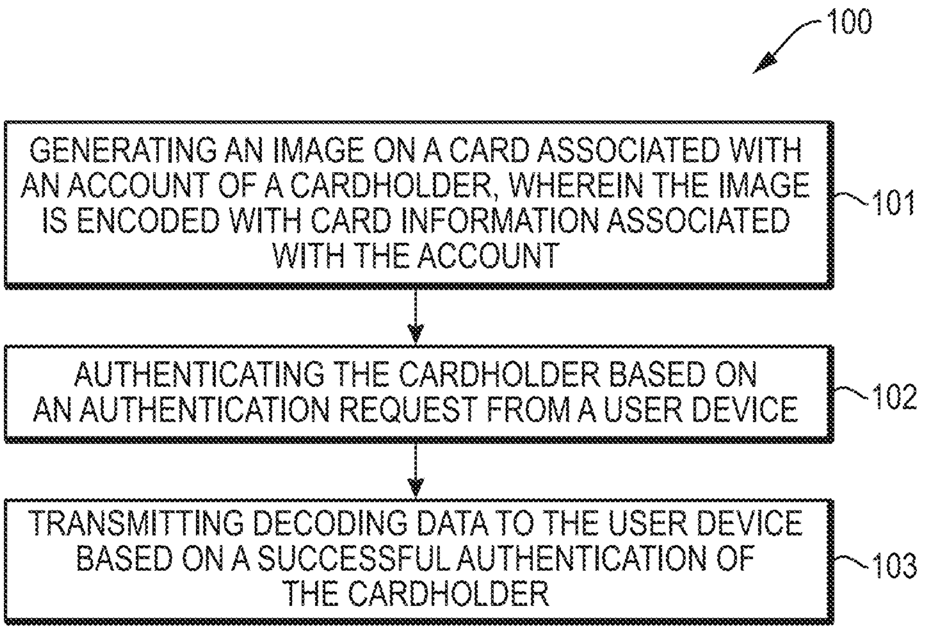

FIG. 3 is a flow diagram illustrating a method, according to at least one aspect of the present disclosure.

Figure 4:
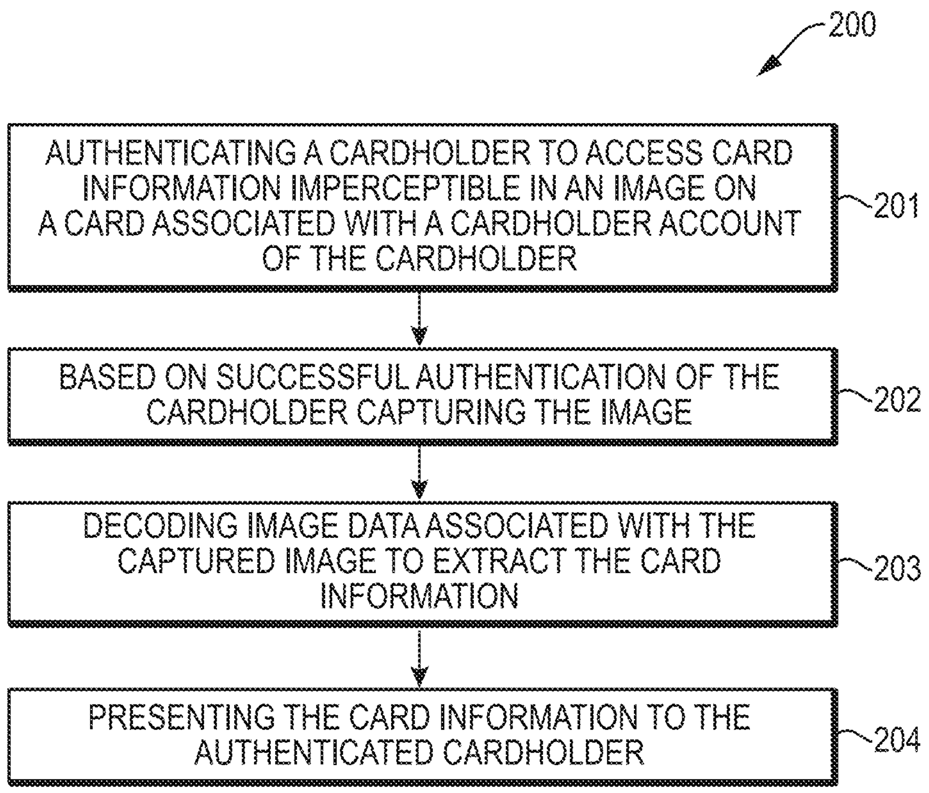

FIG. 4 is a flow diagram illustrating a method, according to at least one aspect of the present disclosure.

Figure 5:
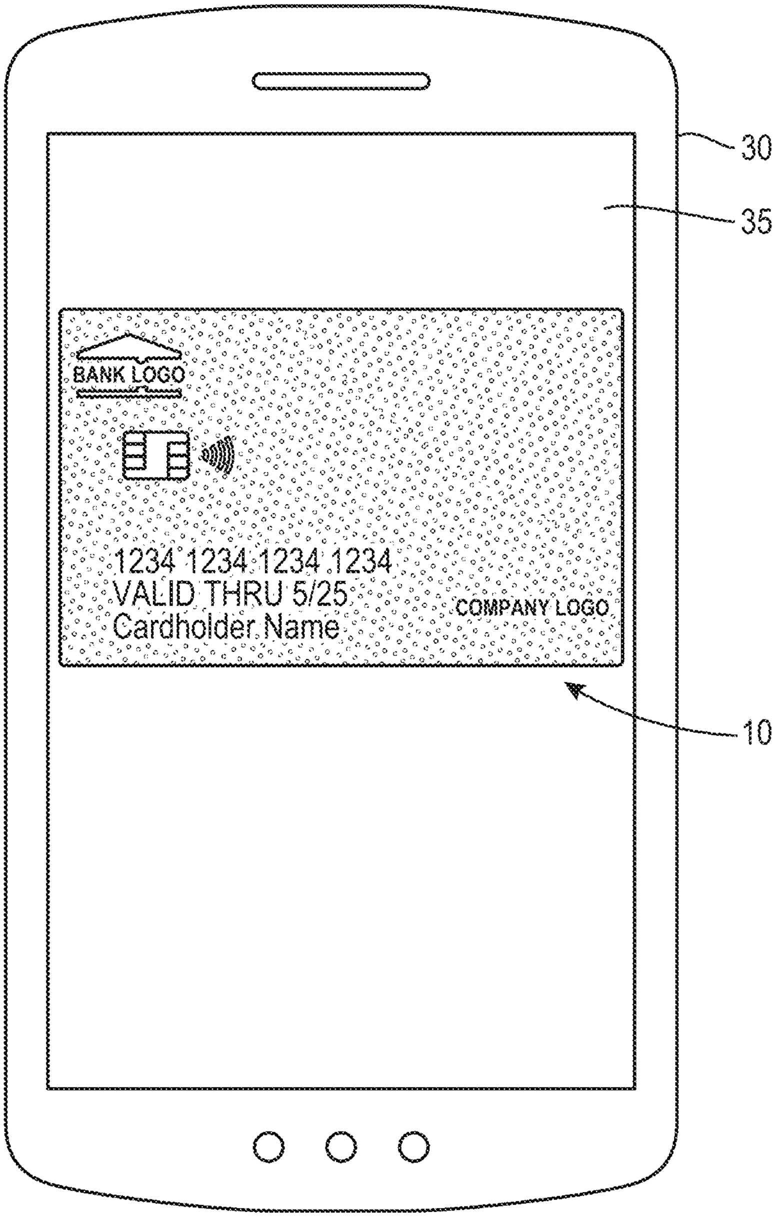

FIG. 5 illustrates a user device displaying the card of FIG. 1 and card information associated with the card.

Figure 6:
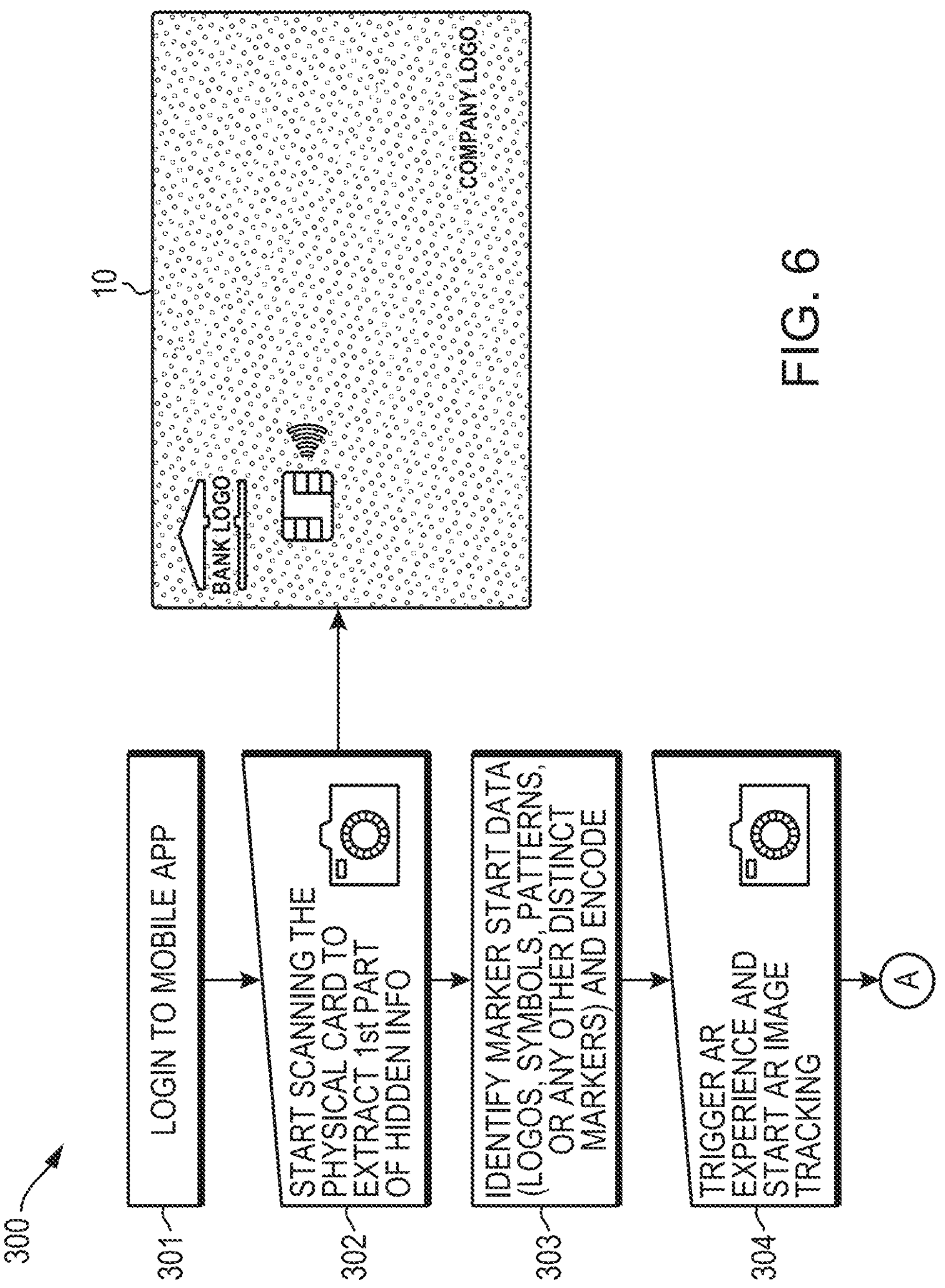
Figure 7:
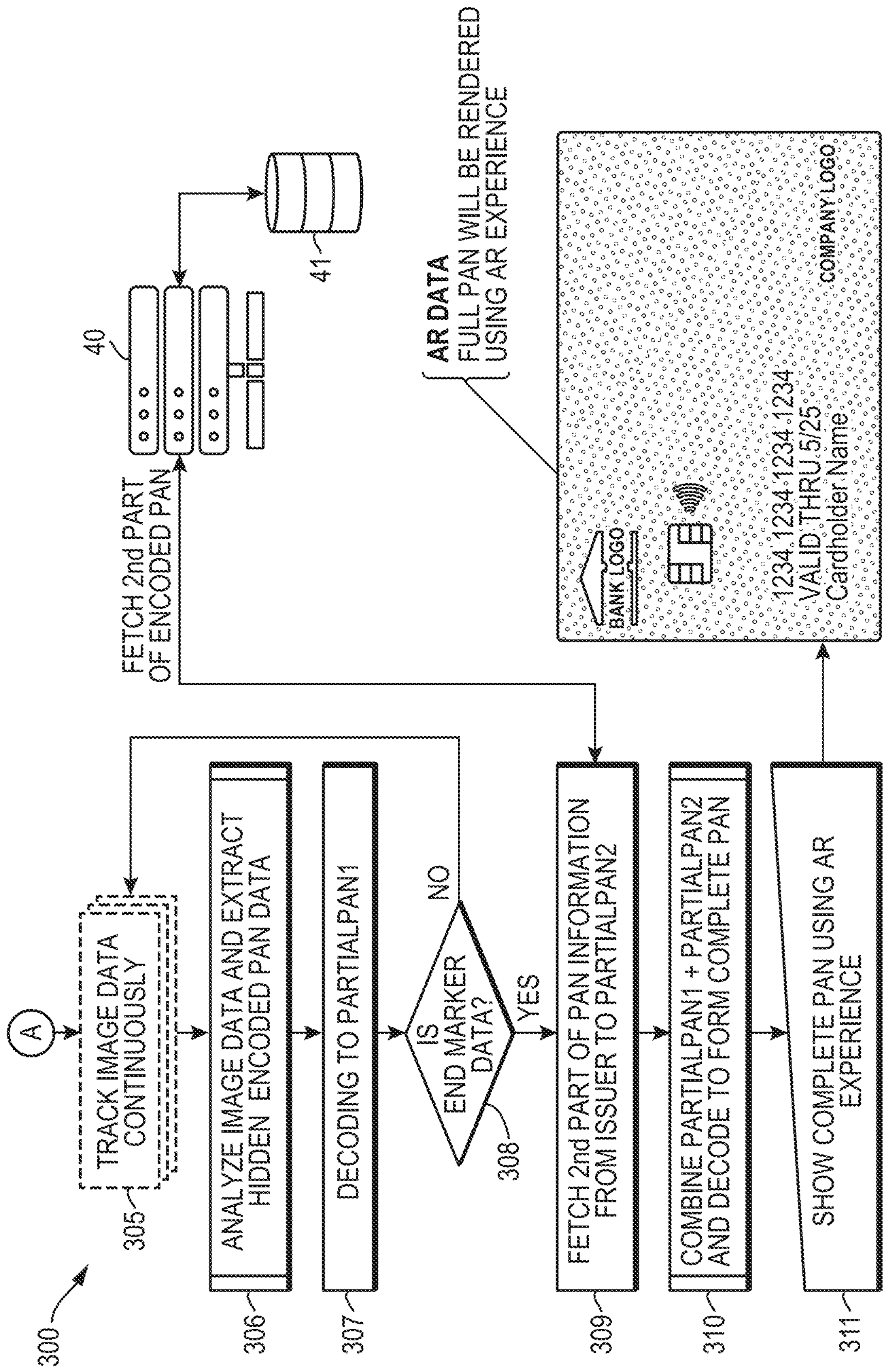

FIGS. 6 and 7 are a flow diagram illustrating a method, according to at least one aspect of the present disclosure.

Figure 8:
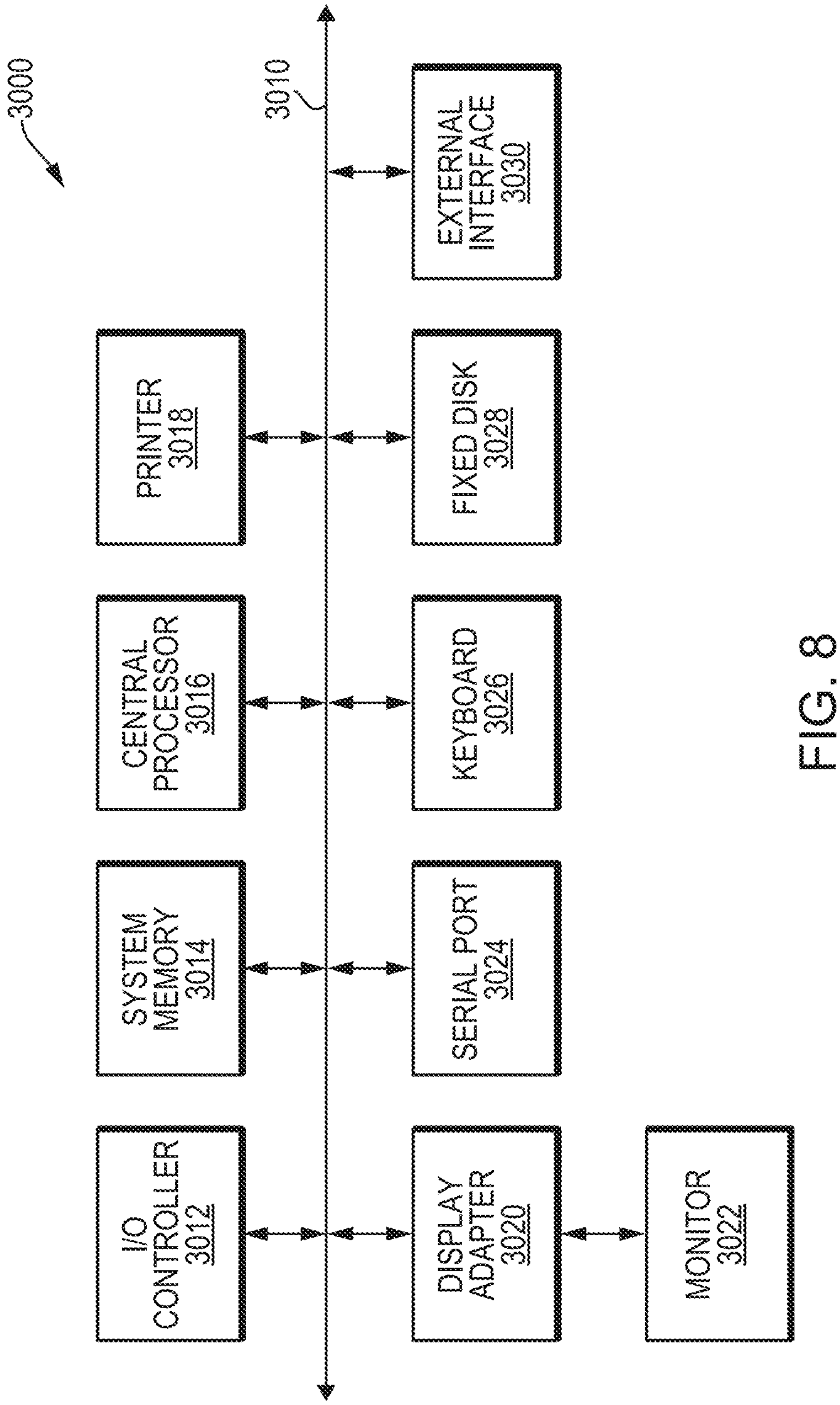

FIG. 8 is a block diagram of a computer apparatus with data processing subsystems or components, according to at least one aspect of the present disclosure.

Figure 9:
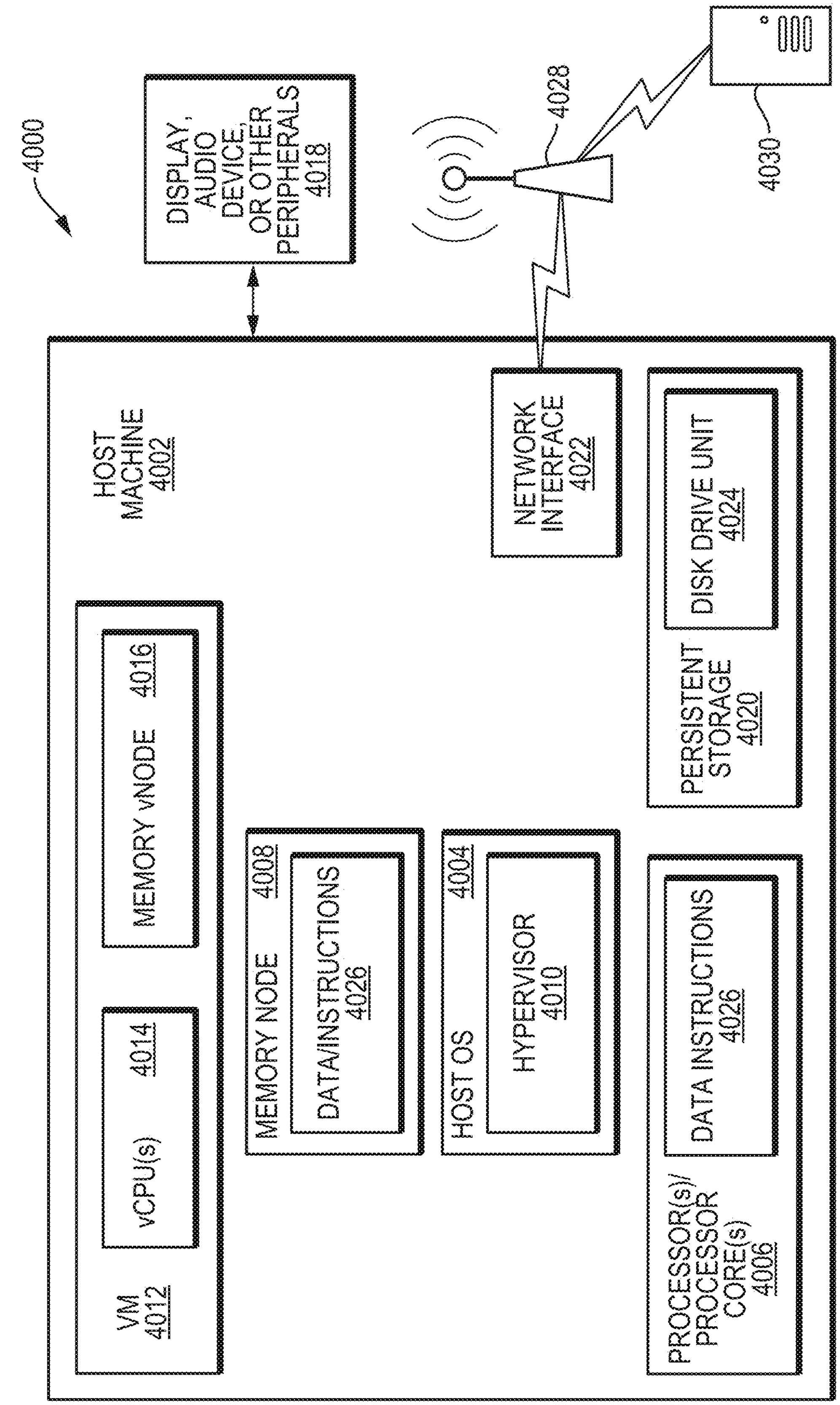

FIG. 9 is a diagrammatic representation of an example system that includes a host machine within which a set of instructions to perform any one or more of the methodologies discussed herein may be executed, according to at least one aspect of the present disclosure.

DESCRIPTION

The following disclosure may provide exemplary systems, devices, and methods for conducting a financial transaction and related activities. Although reference may be made to such financial transactions in the examples provided below, aspects are not so limited. That is, the systems, methods, and apparatuses may be utilized for any suitable purpose.

Before discussing specific embodiments, aspects, or examples, some descriptions of terms used herein are provided below.

A "credential" may be any suitable information that serves as reliable evidence of worth, ownership, identity, or authority. A credential may be a string of numbers, letters, or any other suitable characters that may be present or contained in any object or document that can serve as confirmation. Examples of credentials include value credentials, identification cards, certified documents, access cards, passcodes and other login information, etc.

"Account credentials" may include any information that identifies an account and allows a payment processor to verify that a device, person, or entity has permission to access the account. For example, account credentials may include an account identifier (e.g., a PAN), a token (e.g., account identifier substitute), an expiration date, a cryptogram, a verification value (e.g., card verification value (CVV)), personal information associated with an account (e.g., address, etc.), an account alias, or any combination thereof. Account credentials may be static or dynamic such that they change over time. Further, in some embodiments or aspects, the account credentials may include information that is both static and dynamic. For example, an account identifier and expiration date may be static but a cryptogram may be dynamic and change for each transaction. Further, in some embodiments or aspects, some or all of the account credentials may be stored in a secure memory of a user device. The secure memory of the user device may be configured such that the data stored in the secure memory may not be directly accessible by outside applications and a payment application associated with the secure memory may be accessed to obtain the credentials stored on the secure memory. Accordingly, a mobile application may interface with a payment application in order to gain access to payment credentials stored on the secure memory.

Further, the term "account credential," "account number," or "payment credential" may refer to any suitable information associated with an account (e.g. a payment account and/or payment device associated with the account). Such information may be directly related to the account or may be derived from information related to the account. Examples of account information may include a PAN (primary account number or "account number"), username, expiration date, CVV (card verification value), dCVV (dynamic card verification value), CVV2 (card verification value 2), CVC3 card verification values, etc. Payment credentials may be any information that identifies or is associated with a payment account. Payment credentials may be provided in order to make a payment from a payment account. Payment credentials can also include a username, an expiration date, a gift card number or code, and any other suitable information.

An "application" may include any software module configured to perform a specific function or functions when executed by a processor of a computer. For example, a "mobile application" may include a software module that is configured to be operated by a mobile device. Applications may be configured to perform many different functions. For instance, a "payment application" may include a software module that is configured to store and provide account credentials for a transaction. A "wallet application" may include a software module with similar functionality to a payment application that has multiple accounts provisioned or enrolled such that they are usable through the wallet application. Further, an "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, touchscreen, etc.).

"Authentication" is a process by which the credential of an endpoint (including but not limited to applications, people, devices, process, and systems) can be verified to ensure that the endpoint is who they are declared to be.

The terms "user device" refer to any electronic device that is configured to communicate with one or more servers or remote devices and/or systems. A client device or a user device may include a mobile device, a network-enabled appliance (e.g., a network-enabled television, refrigerator, thermostat, and/or the like), a computer, a point of sale (POS) system, and/or any other device or system capable of communicating with a network. A client device may further include a desktop computer, laptop computer, mobile computer (e.g., smartphone), a wearable computer (e.g., a watch, pair of glasses, lens, clothing, and/or the like), a cellular phone, a network-enabled appliance (e.g., a network-enabled television, refrigerator, thermostat, and/or the like), a POS system, and/or any other device, system, and/or software application configured to communicate with a remote device or system.

As used herein, the term "communication" and "communicate" may refer to the reception, receipt, transmission, transfer, provision, and/or the like of information (e.g., data, signals, messages, instructions, calls, commands, and/or the like). A communication may use a direct or indirect connection and may be wired and/or wireless in nature. As an example, for one unit (e.g., a device, a system, a component of a device or system, combinations thereof, and/or the like) to communicate with another unit means that the one unit is able to directly or indirectly receive information from and/or transmit information to the other unit. The one unit may communicate with the other unit even though the information may be modified, processed, relayed, and/or routed between the one unit and the other unit. In one example, a first unit may communicate with a second unit even though the first unit receives information and does not communicate information to the second unit. For example, a first unit may be in communication with a second unit even though the first unit passively receives data and does not actively transmit data to the second unit. As another example, a first unit may communicate with a second unit if an intermediary unit (e.g., a third unit located between the first unit and the second unit) receives information from the first unit, processes the information received from the first unit to produce processed information, and communicates the processed information to the second unit. In some non-limiting embodiments or aspects, a message may refer to a packet (e.g., a data packet, a network packet, and/or the like) that includes data. It will be appreciated that numerous other arrangements are possible.

Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

A "digital wallet" can include an electronic device that allows an individual to conduct electronic commerce transactions. A digital wallet may be designed to streamline the purchase and payment process. A digital wallet may allow the user to load one or more payment cards onto the digital wallet so as to make a payment without having to enter an account number or present a physical card.

An "interface" may include any software module configured to process communications. For example, an interface may be configured to receive, process, and respond to a particular entity in a particular communication format. Further, a computer, device, and/or system may include any number of interfaces depending on the functionality and capabilities of the computer, device, and/or system. In some embodiments or aspects, an interface may include an application programming interface (API) or other communication format or protocol that may be provided to third parties or to a particular entity to allow for communication with a device. Additionally, an interface may be designed based on functionality, a designated entity configured to communicate with, or any other variable. For example, an interface may be configured to allow for a system to field a particular request or may be configured to allow a particular entity to communicate with the system.

An "issuer" can include a payment account issuer. The payment account (which may be associated with one or more payment devices) may refer to any suitable payment account (e.g. credit card account, a checking account, a savings account, a merchant account assigned to a consumer, or a prepaid account), an employment account, an identification account, an enrollment account (e.g. a student account), etc.

As used herein, the term "server" may include one or more computing devices which can be individual, standalone machines located at the same or different locations, may be owned or operated by the same or different entities, and may further be one or more clusters of distributed computers or "virtual" machines housed within a datacenter. It should be understood and appreciated by a person of skill in the art that functions performed by one "server" can be spread across multiple disparate computing devices for various reasons. As used herein, a "server" is intended to refer to all such scenarios and should not be construed or limited to one specific configuration. Further, a server as described herein may, but need not, reside at (or be operated by) a merchant, a payment network, a financial institution, a healthcare provider, a social media provider, a government agency, or agents of any of the aforementioned entities. The term "server" may also refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices, e.g., point-of-sale devices, directly or indirectly communicating in the network environment may constitute a "system," such as a merchant's point-of-sale system. Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Fraudsters are becoming increasingly sophisticated, utilizing a myriad of methods to commit fraud. They exploit stolen credentials and recruit accomplices via social media, all while orchestrating phishing and social engineering attacks. The tools and services designed for fraud detection and prevention are becoming more sophisticated but struggle to effectively protect readily visible card indicia. For example, card numbers and related information are frequently stolen using cameras at payment terminals. One possible method of thwarting card information theft is to provide a user a card with just the payment instrument (e.g., chip, magnetic stripe) and no printed card information. While this may be a helpful first step, cards without any printed information may be inconvenient for the user in some use cases and should not be the only security measure. Accordingly, there is a need for providing card indicia in a highly secure and convenient manner.

FIG. 1 illustrates a secure card 10 associated with an account of a cardholder. The card 10 includes a card face 11 with imperceptible card indicia. Unlike traditional cards with readily discernable card indicia, the imperceptible card indicia of the card face 11 are represented on the card face 11 but are not readily discernable. The imperceptible card indicia may include card information such as, for example, an account number, a name of the cardholder, an expiration date, and/or a Card Verification Value (CCV).

The imperceptible card indicia may include of one or more parts of an account number, a name of the cardholder, an expiration date, and/or CCV. The remaining parts can be readily discernable on the card face 11 or can be retrievable, as described in greater detail below. In one example, as illustrated in FIG. 2, some digits of the account number can be readily discernable on the card face 11, while the remaining digits are represented, but not readily discernable. Additionally, or alternatively, certain letters of the name can be readily discernable on the card face 11, while the remaining letters are represented, but not readily discernable.

Splitting card information such as, for example, a primary account number into a discernable part (e.g., visible on the card face 11) and an imperceptible part (e.g., encoded) adds another layer of security. The full primary account number cannot be obtained by a fraudster without access to the card, to obtain visible digits, and server data to obtain decoding data necessary for obtaining imperceptible digits.

The card face 11 features a graphical representation, designated as image 12. Encoded within image 12 are imperceptible card indicia, which remain inaccessible to the naked eye but can be retrieved through a decoding process. The imperceptible card indicia may be incorporated into the image 12, taking the form of one or more patterns, symbols, shapes, numerals, icons, or a combination thereof, thereby embedding the imperceptible card indicia seamlessly within the visual content.

The imperceptible card indicia may be encoded in a specific section of the image 12. The image 12 may include a recognizable marker that indicates the location of the imperceptible card indicia within the image 12. Detecting the marker may trigger an identification of a section of the image 12 that includes the imperceptible card indicia. Accordingly, only the identified section is decoded to identify the card information.

Any suitable encoding/decoding technique can be utilized such as, for example, color encoding. The card information may be converted into imperceptible card indicia by converting first into binary data. The card information may be hashed or encrypted prior to converting into binary data.

The binary data may then be integrated into the image 12. In one embodiment, the least significant bit (LSB) of each pixel's color value, in the image 12, can be altered to correspond to a bit of the binary data. Given that the LSB exerts minimal influence on the overall color value, its modification is unlikely to produce any discernible alteration the appearance of the image 12. A lossless image format may be utilized to retrieve image data from the image 12, since lossy formats may alter the image data to reduce file size, which can lead to a destruction of the imperceptible card indicia.

FIG. 2 illustrates a system 20 for use with the card 10 in a transaction, in accordance with at least one aspect of the present disclosure. The system 20 includes a user device 30 configured to communicate with an issuer server 40 through a network 50. The user device 30 includes an imaging device 31 such as, for example, a camera, a communication interface 32, a user interface 35, a processor 33, and a memory 34. The processor 33 may execute program instructions stored in the memory 34. The program instructions may be defined by one or more steps of one or more methods described herein. The user device 30 may further include an NFC interface 36 for wireless communication with the card 10.

FIG. 3 illustrates a method 100, according to at least one aspect of the present disclosure. The method 100 can be performed by an issuer server 40, for example. The method 100 includes generating 101 an image on a card (e.g., card 10) associated with an account of a cardholder, wherein the image is encoded with card information associated with the account. The issuer server 40 may generate the card 10 in digital form and/or in physical form for a cardholder. Card information associated with the account of the cardholder is encoded within the image 12, as described in connection with FIG. 1. Selection of the starting image to generate the image 12 can be achieved automatically by the issuer server 40 or can be based on input from the cardholder.

Generating 101 the image 12 may include selecting a portion of a starter image for encoding, placing and/or identifying a marker near the selected potion for later recognition, and converting the card information into binary data, and incorporating the binary data into the image data associated with the selected portion. The image 12 is then created from the modified image data and placed on the card 10 in a digital form and/or in a physical form. The issuer server 40 may further generate decoding data for the image 12. The decoding data and associated card information may be stored in a database 41, for example.

As discussed previously, encoding the card information may further include encrypting/hashing the card information prior converting to the binary data. While encoding is described in the context of a portion of the image 12, it is understood that it can be equally applied to the entirety of the image 12.

The card 10 is then sent to the cardholder either physically or digitally into an application of the issuer server 40 or a digital wallet of the cardholder, which is installed in the user device 30, for example.

The method 100 further includes authenticating 102 the cardholder based on an authentication request from a user device 30. In the event of a successful authentication, the method 100 further includes transmitting 103 decoding data to the user device 30. Alternatively, the decoding data can be stored on the user device 30 in an encrypted format. In such instance, the method 100 includes transmitting a decryption key to the user device 30 to access the decoding data.

In instances where the decoding data and corresponding card information are stored in the database 41, the issuer server 40 may utilize the card information to identify the decoding data for transmission to the user device 30. Alternatively, other identification information based on the authentication request can be utilized to retrieve corresponding decoding data from the database 41.

FIG. 4 illustrates a method 200, according to at least one aspect of the present disclosure. The method 200 can be performed by the user device 30 to process a transaction with a card (e.g., card 10). The method 200 includes authenticating 201 a cardholder to access card information imperceptible in an image (e.g., image 12) on a card (e.g., card 10) associated with an account of the cardholder.

As illustrated in FIG. 2, the user device 30 may interact with the card 10 through the NFC interface 36. The user device 30 may receive account-related data from the integrated processor chip of the card 10. The received data may encompass credentials (e.g., account credentials, authentication credentials) to share with the issuer server 40, for example. In some aspects, the user device 30 is configured to transmit an authentication request to the issuer server 40. The request may include user device identification information along with a portion or the entirety of the data procured from the processor chip of the card 10.

In the event of a successful authentication of the cardholder, the method 200 further includes capturing 202 the image, which can be achieved by the imaging device 31. The method 200 further includes decoding 203 image data associated with the captured image to extract the card information, and presenting 204 the card information to the authenticated cardholder.

The processor 33 may utilize one or more applications for receiving and reviewing images from the imaging device 31. These may incorporate object recognition and analysis capabilities. The processor 33 may also utilize one or more applications for generating AR images and displaying them in conjunction with real time views of recognized objects (e.g. card 10). These AR images may incorporate card information, extracted from decoding the image 12, and can be constructed for display superimposed on the real time image of the object. These applications can be stored locally on the memory 34, for example, or can be on a remote server accessible by the user device 30.

In one embodiment, presenting 204 the card information extracted from the image 12 includes capturing a real time image of the card 10, constructing an AR image using the card information, and displaying the card information over the real time image of the card 10 in such a way that the information appears to be a part of the card 10 or applied to a surface of the card 10, as illustrated in FIG. 5. Alternatively, in instances where the card 10 is stored digitally, for example in a digital wallet, the extracted card information can be superimposed onto the card 10, for example in an issuer application, or in the digital wallet.

The user device 30 may be configured to initiate, or activate, an issuer server application to perform the cardholder authentication based on detecting/recognizing the image 12, or one or more parts of it, or identification markers on it. The issuer server application may require the cardholder to enter a password, or other forms of identification, to begin the authentication. If the authentication is successful, the user device 30 may then extract and present the card information to the cardholder, as illustrated in FIG. 5, for example.

In some aspects, the image 12 may incorporate a start marker and/or an end marker, which can be in the form of one or more logos, symbols, patterns, shapes, or any other distinct markers to bracket/identify data and/or parts of the image 12 relevant to card information extraction.

The encoded card information of the methods 100, 200 may include of one or more parts of an account number, a name, an expiration date, and/or CCV. The remaining parts may be readily discernable on the card face 11 or may be retrievable from issuer server 40. In one example, a first part of the account number can be readily discernable on the card face 11, while the remaining digits are encoded into the image 12, but not readily discernable. Additionally, or alternatively, certain letters of the name can be readily discernable on the card face 11, while the remaining letters are encoded into the image 12, but not readily discernable. In one example, the name or expiration code can be readily discernable on the card face 11, while the account number, or a portion thereof, is encoded into the image 12, but not readily discernable.

FIGS. 6 and 7 illustrate a method 300 similar in many respects to the method 200, which are not all repeated herein for brevity. Like the method 200, the method 300 can be performed by the user device 30. The method 300 addresses an instance where a first part of a primary account number (PAN) is encoded in the image 12 of the card 10, and a second part is readily discernable on the card face 11 or retrievable from the issuer server 40. The user device 30 may employ a mobile application (e.g., issuer application) to coordinate various aspects of the method 300.

The method 300 includes prompting 301 a user login to permit a cardholder that wishes to view the complete PAN of the card 10 access to the mobile application. If a successful login is achieved, the mobile application may activate the imaging device 31 to scan 302 the card 10 to extract an imperceptible first part of PAN. Alternatively, the login may not be required, and activation of the imaging device 31 can be triggered by receiving a user input through the user interface 35 (e.g., pressing an icon in the mobile application). The method 300 further includes identifying 303 marker start data (e.g., logos, symbols, patterns) indicative of the beginning of an encoded portion of the image 12.

The method 300 further includes triggering 304 an AR experience to continuously track 305 the image 12 on the card 10 in response to identifying 303 the marker start data. The method 300 further includes analyzing 306 the image data, extracting hidden encoded PAN data, and decoding 307 until an end marker data is detected 308. If the first part of the PAN is encrypted, a decryption key can be employed to decrypt the PAN data to retrieve the first part of the PAN. The decryption key and/or the decoding data may be retrieved from the issuer server 40, for example.

Additionally, the mobile application may retrieve 309 a second part of the PAN from the issuer server 40, and combine 310 the first part and the second part to present 311 a complete PAN to the cardholder using the AR experience, as illustrated in FIG. 7.

Components of the system 20 can be implemented in software, hardware, and/or combinations thereof. Such components may include, or make use of, one or more computer apparatuses, computer systems, or the like. Each of these computer apparatuses, computer servers, computer systems, or the like are described in greater detail below with respect to the computer apparatus 3000 shown in FIG. 8 and computer system 4000 shown in FIG. 9.

FIG. 8 is a block diagram of a computer apparatus 3000 with data processing subsystems or components, according to at least one aspect of the present disclosure. The subsystems shown in FIG. 9 are interconnected via a system bus 3010. Additional subsystems such as a printer 3018, keyboard 3026, fixed disk 3028 (or other memory comprising computer-readable media), monitor 3022 (which is coupled to a display adapter 3020), and others are shown. Peripherals and input/output (I/O) devices, which couple to an I/O controller 3012 (which can be a processor or other suitable controller), can be connected to the computer system by any number of means known in the art, such as a serial port 3024. For example, the serial port 3024 or external interface 3030 can be used to connect the computer apparatus to a wide area network such as the Internet, a mouse input device, or a scanner. The interconnection via system bus 3010 allows the central processor 3016 to communicate with each subsystem and to control the execution of instructions from system memory 3014 or the fixed disk 3028, as well as the exchange of information between subsystems. The system memory 3014 and/or the fixed disk 3028 may embody a computer-readable medium.

FIG. 9 is a diagrammatic representation of an example system 4000 that includes a host machine 4002 within which a set of instructions to perform any one or more of the methodologies discussed herein may be executed, according to at least one aspect of the present disclosure. In various aspects, the host machine 4002 operates as a stand-alone device or may be connected (e.g., networked) to other machines. In a networked deployment, the host machine 4002 may operate in the capacity of a server or a client machine in a server-client network environment, or as a peer machine in a peer-to-peer (or distributed) network environment. The host machine 4002 may be a computer or computing device, a personal computer (PC); a tablet PC; a set-top box; a personal digital assistant; a cellular telephone; a portable music player (e.g., a portable hard drive audio device, such as an Moving Picture Experts Group Audio Layer 3 (MP3) player); a web appliance; a network router, switch, or bridge; or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example system 4000 includes the host machine 4002, running a host operating system (OS) 4004 on a processor or multiple processor(s)/processor core(s) 4006 (e.g., a central processing unit (CPU), a graphics processing unit, or both), and various memory nodes 4008. The host OS 4004 may include a hypervisor 4010, which is able to control the functions and/or communicate with a virtual machine (VM) 4012 running on machine-readable media. The VM 4012 also may include a virtual CPU or vCPU 4014. The memory nodes 4008 may be linked or pinned to virtual memory nodes or vNodes 4016. When the memory node 4008 is linked or pinned to a corresponding vNode 4016, then data may be mapped directly from the memory nodes 4008 to their corresponding vNodes 4016.

All the various components shown in host machine 4002 may be connected with and to each other or communicate to each other via a bus (not shown) or via other coupling or communication channels or mechanisms. The host machine 4002 may further include a video display, audio device, or other peripherals 4018 (e.g., a liquid crystal display; alphanumeric input device(s) including, e.g., a keyboard; a cursor control device, e.g., a mouse; a voice recognition or biometric verification unit; an external drive; a signal generation device, e.g., a speaker); a persistent storage device 4020 (also referred to as disk drive unit); and a network interface device 4022. The host machine 4002 may further include a data encryption module (not shown) to encrypt data. The components provided in the host machine 4002 are those typically found in computer systems that may be suitable for use with aspects of the present disclosure and are intended to represent a broad category of such computer components that are known in the art. Thus, the system 4000 can be a server, minicomputer, mainframe computer, or any other computer system. The computer may also include different bus configurations, networked platforms, multi-processor platforms, and the like. Various OSs may be used, including UNIX, LINUX, WINDOWS, QNX ANDROID, IOS, CHROME, TIZEN, and other suitable OSs.

The disk drive unit 4024 also may be a solid-state drive, a hard disk drive, or other drive that includes a computer or machine-readable medium on which is stored one or more sets of instructions and data structures (e.g., data/instructions 4026) embodying or utilizing any one or more of the methodologies or functions described herein. The data/instructions 4026 also may reside, completely or at least partially, within the main memory node 4008 and/or within the processor(s) 4006 during execution thereof by the host machine 4002. The data/instructions 4026 may further be transmitted or received over a network 4028 via the network interface device 4022 utilizing any one of several well-known transfer protocols (e.g., Hyper Text Transfer Protocol (HTTP)).

The processor(s) 4006 and memory nodes 4008 also may comprise machine-readable media. The term "computer-readable medium" or "machine-readable medium" should be taken to include a single medium or multiple medium (e.g., a centralized or distributed database and/or associated caches and servers) that store the one or more sets of instructions. The term "computer-readable medium" shall also be taken to include any medium that is capable of storing, encoding, or carrying a set of instructions for execution by the host machine 4002 and that causes the host machine 4002 to perform any one or more of the methodologies of the present application or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read-only memory (ROM), and the like. The example aspects described herein may be implemented in an operating environment comprising software installed on a computer, in hardware, or in a combination of software and hardware.

Examples of the devices and methods disclosed herein, according to various aspects of the present disclosure, are provided below in the following embodiments. An aspect of the devices and methods may include any one or more than one of, and any combination of, the embodiments described below.

In a first embodiment, the present disclosure provides a secure card associated with an account of a cardholder, the secure card including a card face. The card face includes imperceptible card indicia including at least a portion of at least one of an account number, a name, a card verification value, or an expiration date. The card face further includes an image. The imperceptible card indicia are encoded within the image.

Additionally, in the first embodiment, the image includes at least one of a pattern, a symbol, shape, number, or icon, or combinations thereof; further includes a physical card; or the image is an image print on the physical card; or any combination thereof.

Alternatively, in the first embodiment, the card face is defined by a card surface, and the image is disposed on the card surface; the imperceptible card indicia are encrypted; or the card shows an unencoded remainder of: the account number, the name, card verification value, or the expiration date; or any combination thereof.

In a second embodiment, the present disclosure provides a computer-implemented method including authenticating, by a user device, a cardholder to access card information imperceptible in an image on a card associated with a cardholder account of the cardholder; capturing, by an imaging device of the user device, the image based on a successful authentication of the cardholder; processing, by the user device, the image to generate image data from the captured image; decoding, by the user device, the image data to extract the card information from the image data; and presenting, by the user device, the card information to the authenticated cardholder.

Additionally, in the second embodiment, the card information includes at least a portion of at least one of an account number, a name, a card verification value, or an expiration date; the portion is a first portion, and the method further includes retrieving a second portion from a server, and combining the first portion and the second portion to obtain the at least one of the account number, the name, the card verification value, or the expiration date; or the portion is a first portion, and the method further includes retrieving a second portion from the image data, the second portion is unencoded, and combining the first portion and the second portion to obtain the at least one of the account number, the name, the card verification value, or the expiration date.

Alternatively, in the second embodiment, presenting the card information includes rendering, by the user device, the card information onto the card; decoding the image data includes identifying a predetermined maker in the image; or the card information is encrypted, and the method further includes receiving, by the user device, a decryption key from an issuer server, decrypting, by the user device, the card information; or any combination thereof.

In a third embodiment, the present disclosure provides, a computer-implemented method including generating an image on a card associated with an account of a cardholder. The image is encoded with card information associated with the account. The computer-implemented method further includes authenticating the cardholder based on an authentication request from a user device; and transmitting decoding data to the user device based on a successful authentication of the cardholder.

Additionally, in the third embodiment, generating the image includes converting the card information into binary data, and incorporating the binary data into image data associated with the image; or generating the image further includes encrypting the card information prior to converting into the binary data; or any combination thereof.

Alternatively, the third embodiment further includes encrypting the card information prior to generating the image, and transmitting a decryption key to the user device based on the successful authentication of the cardholder; or the decoding data enable the user device to extract the card information from image data retrieved from the image; or any combination thereof.

One skilled in the art will recognize that Internet service may be configured to provide Internet access to one or more computing devices that are coupled to the Internet service and that the computing devices may include one or more processors, buses, memory devices, display devices, I/O devices, and the like. Furthermore, those skilled in the art may appreciate that the Internet service may be coupled to one or more databases, repositories, servers, and the like, which may be utilized to implement any of the various aspects of the disclosure as described herein.

The computer program instructions also may be loaded onto a computer, a server, other programmable data processing apparatus, or other devices to cause a series of operational steps to be performed on the computer, other programmable apparatus, or other devices to produce a computer-implemented process such that the instructions that execute on the computer or other programmable apparatus provide processes for implementing the functions/acts specified in the flowchart and/or block diagram block or blocks.

Suitable networks may include or interface with any one or more of, for instance, a local intranet; a personal area network (PAN); a local area network (LAN); a wide area network (WAN); a metropolitan area network (MAN); a virtual private network (VPN); a storage area network (SAN); a frame relay connection; an advanced intelligent network (AIN) connection; a synchronous optical network (SONET) connection; a digital T1, T3, E1, or E3 line; a digital data service (DDS) connection; a digital subscriber line (DSL) connection; an Ethernet connection; an integrated services digital network (ISDN) line; a dial-up port, such as a V.90, V.34, or V.34bis analog modem connection; a cable modem; an Asynchronous Transfer Mode (ATM) connection; or an Fiber Distributed Data Interface (FDDI) or Copper Distributed Data Interface (CDDI) connection. Furthermore, communications may also include links to any of a variety of wireless networks, including Wireless Application Protocol (WAP), General Packet Radio Service (GPRS), Global System for Mobile Communication (GSM), Code Division Multiple Access (CDMA) or Time Division Multiple Access (TDMA), cellular phone networks, global positioning system (GPS), cellular digital packet data (CDPD), Research in Motion, Limited (RIM) duplex paging network, Bluetooth radio, or an Institute of Electrical and Electronics Engineers (IEEE) 802.11-based radio frequency (RF) network. The network 4028 can further include or interface with any one or more of an RS-232 serial connection, an IEEE-1394 (Firewire) connection, a Fiber Channel connection, an IrDA (infrared (IR)) port, a Small Computer Systems Interface (SCSI) connection, a Universal Serial Bus (USB) connection or other wired or wireless, digital, or analog interface or connection, mesh, or Digi® networking.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the host machine 4002, with each server 4030 (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one aspect of a bus. Transmission media can also take the form of acoustic or light waves, such as those generated during RF and IR data communications. Common forms of computer-readable media include, for example, a flexible disk, a hard disk, magnetic tape, any other magnetic medium, a compact disc ROM (CD-ROM) disk, digital video disc, any other optical medium, any other physical medium with patterns of marks or holes, a RAM, a programmable ROM, an erasable programmable ROM (EPROM), an electrically erasable programmable ROM (EEPROM), a FLASH EPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object-oriented programming language such as Java, Smalltalk, C++, or the like and conventional procedural programming languages, such as the "C" programming language, Go, Python, or other programming languages, including assembly languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a LAN or a WAN, or the connection may be made to an external computer (for example, through the Internet using an Internet service provider).

The foregoing detailed description has set forth various forms of the systems and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skilled in the art in light of this disclosure. In addition, those skilled in the art will appreciate that the mechanisms of the subject matter described herein are capable of being distributed as one or more program products in a variety of forms, and an illustrative form of the subject matter described herein applies regardless of the particular type of signal-bearing medium used to actually carry out the distribution.

Instructions used to program logic to perform various disclosed aspects can be stored within a memory in the system, such as dynamic RAM, cache, flash memory, or other storage. Furthermore, the instructions can be distributed via a network or by way of other computer-readable media. Thus a machine-readable medium may include any mechanism for storing or transmitting information in a form readable by a machine (e.g., a computer), including, but not limited to, floppy diskettes, optical disks, CD-ROMs, magneto-optical disks, ROM, RAM, EPROM, EEPROM, magnetic or optical cards, flash memory, or a tangible, machine-readable storage used in the transmission of information over the Internet via electrical, optical, acoustical, or other forms of propagated signals (e.g., carrier waves, IR signals, digital signals). Accordingly, the non-transitory computer-readable medium includes any type of tangible machine-readable medium suitable for storing or transmitting electronic instructions or information in a form readable by a machine (e.g., a computer).

Any of the software components or functions described in this application may be implemented as software code to be executed by a processor using any suitable computer language, such as, for example, Python, Java, C++, or Perl, using, for example, conventional or object-oriented techniques. The software code may be stored as a series of instructions or commands on a computer-readable medium, such as RAM, ROM, a magnetic medium such as a hard drive or a floppy disk, or an optical medium such as a CD-ROM. Any such computer-readable medium may reside on or within a single computational apparatus and may be present on or within different computational apparatuses within a system or network.

As used in any aspect herein, the term "logic" may refer to an app, software, firmware, and/or circuitry configured to perform any of the aforementioned operations. Software may be embodied as a software package, code, instructions, instruction sets, and/or data recorded on a non-transitory computer-readable storage medium. Firmware may be embodied as code, instructions, instruction sets, and/or data that are hard-coded (e.g., non-volatile) in memory devices.

As used in any aspect herein, the terms "component," "system," "module," and the like can refer to a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states that may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

A network may include a packet-switched network. The communication devices may be capable of communicating with each other using a selected packet-switched network communications protocol. One example communications protocol may include an Ethernet communications protocol, which may be capable of permitting communication using a Transmission Control Protocol/Internet Protocol. The Ethernet protocol may comply or be compatible with the Ethernet standard published by the IEEE titled "IEEE 802.3 Standard," published in December 2008 and/or later versions of this standard. Alternatively, or additionally, the communication devices may be capable of communicating with each other using an X.25 communications protocol. The X.25 communications protocol may comply or be compatible with a standard promulgated by the International Telecommunication Union-Telecommunication Standardization Sector. Alternatively, or additionally, the communication devices may be capable of communicating with each other using a frame relay communications protocol. The frame relay communications protocol may comply or be compatible with a standard promulgated by Consultative Committee for International Telegraph and Telephone and/or the American National Standards Institute. Alternatively, or additionally, the transceivers may be capable of communicating with each other using the ATM communications protocol. The ATM communications protocol may comply or be compatible with an ATM standard published by the ATM Forum titled "ATM-MPLS Network Interworking 2.0," published August 2001, and/or later versions of this standard. Of course, different and/or after-developed connection-oriented network communication protocols are equally contemplated herein.

Unless specifically stated otherwise as apparent from the foregoing disclosure, it is appreciated that, throughout the present disclosure, discussions using terms such as "processing," "computing," "calculating," "determining," "displaying," or the like refer to the action and processes of a computer system, or similar electronic computing device, that manipulates and transforms data represented as physical (electronic) quantities within the computer system's registers and memories into other data similarly represented as physical quantities within the computer system memories, registers, or other such information storage, transmission, or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components, inactive-state components, and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including, but not limited to"; the term "having" should be interpreted as "having at least"; the term "includes" should be interpreted as "includes, but is not limited to"). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include, but not be limited to, systems that have A alone, B alone, C alone, A and B together, A and C together, B and C together, and/or A, B, and C together). In those instances where a convention analogous to "at least one of A, B, or C, etc." is used, in general, such a construction is intended in the sense one having skill in the art would understand the convention (e.g., "a system having at least one of A, B, or C" would include, but not be limited to, systems that have A alone, B alone, C alone, A and B together, A and C together, B and C together, and/or A, B, and C together). It will be further understood by those skilled in the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A," "B," or "A and B."

With respect to the appended claims, those skilled in the art will appreciate that recited operations therein may generally be performed in any order. Also, although various operational flow diagrams are presented in sequence(s), it should be understood that the various operations may be performed in other orders than those that are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the features, structures, or characteristics may be combined in any suitable manner in one or more aspects.

As used herein, the singular form of "a," "an," and "the" include the plural references unless the context clearly dictates otherwise.

Any patent application, patent, non-patent publication, or other disclosure material referred to in this specification and/or listed in any Application Data Sheet is incorporated by reference herein, to the extent that the incorporated material is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material. None is admitted to be prior art.

In summary, numerous benefits have been described that result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described to illustrate principles and practical application to thereby enable one of ordinary skill in the art to utilize the various forms with various modifications as are suited to the particular use contemplated. It is intended that the claims submitted herewith define the overall scope.

What is claimed is:

1. A secure card associated with an account of a cardholder, the secure card comprising:
- a card face comprising imperceptible card indicia including a first portion of at least one of an account number, a name, a card verification value, or an expiration date;
- wherein the card face comprises an image, wherein the imperceptible card indicia are encoded within the image,
- one or more markers in the image to be identified by the user device, the one or more markers comprising at least one of a logo, a symbol, or a pattern separate from the first portion; and the one or more markers used to initiate decoding of the image to extract the first portion of the card information; and
- wherein decoding data is stored on an issuer server, and wherein a second portion is retrievable from the issuer server upon authentication, by an issuer, of the cardholder.

2. The secure card of claim 1, wherein the image comprises at least one of a pattern, a symbol, shape, number, or icon, or combinations thereof.

3. The secure card of claim 2, further comprising a physical card.

4. The secure card of claim 3, wherein the image is an image print on the physical card.

5. The secure card of claim 1, wherein the card face is defined by a card surface; and wherein the image is disposed on the card surface.

6. The secure card of claim 1, wherein the imperceptible card indicia are encrypted.

7. The secure card of claim 1, wherein the secure card shows an unencoded remainder of:
- the account number,
- the name,
- a card verification value, or
- the expiration date.

8. A computer-implemented method, comprising:
- generating, by an issuer, an image on a card associated with an account of a cardholder, wherein the image is encoded with a first portion of card information associated with the account;
- identifying, by the user device, one or more markers in the image, the one or more markers comprising at least one of a logo, a symbol, or a pattern separate from the first portion; and using the one or more markers to initiate decoding of the image to extract the first portion of the card information:
- authenticating the cardholder, by the issuer, based on an authentication request from a user device;
- transmitting, from the issuer server, the decoding data to the user device based on a successful authentication of the cardholder;
- transmitting a second portion of the card information from the issuer server;
- combining the first portion and the second portion to obtain the card information.

9. The computer-implemented method of claim 8, wherein generating the image comprises:
- converting the card information into binary data,
- incorporating the binary data into image data associated with the image.

10. The computer-implemented method of claim 9, wherein generating the image further comprises:
- encrypting the first portion of the card information prior to converting into the binary data.

11. The computer-implemented method of claim 8, further comprising:
- encrypting first portion of the card information prior to generating the image; and
- transmitting a decryption key to the user device based on the successful authentication of the cardholder.

12. The computer-implemented method of claim 8, wherein the decoding data enable the user device to extract the first portion the card information from image data retrieved from the image.

13. The secure card of claim 1, wherein the second portion comprises remaining digits of a primary account number not encoded in the image.

14. The secure card of claim 1, wherein the card face comprises a marker encoded within the image, the marker indicating a boundary of the imperceptible card indicia within the image.

15. The computer-implemented method of claim 8, wherein authenticating the cardholder comprises:

receiving, by the issuer, an authentication request from the user device; and verifying, by the issuer, identity of the cardholder based on the authentication request, wherein transmitting the decoding data and transmitting the second portion of the card information are each conditioned on successful verification by the issuer.

16. The computer-implemented method of claim 8, further comprising: detecting, by the user device, an end marker in the image data during decoding of the image, wherein fetching the second portion of the card information from the issuer is triggered upon detection of the end marker.

17. The computer-implemented method of claim 8, further comprising: storing the decoding data on the user device in an encrypted format; and wherein transmitting from the issuer comprises transmitting a decryption key to the user device based on the successful authentication, the decryption key enabling the user device to access the decoding data.

* * * * *